United States Patent [19]

Alexander

[11] Patent Number: 5,120,181
[45] Date of Patent: Jun. 9, 1992

[54] VEHICLE RESTRAINT

[75] Inventor: James C. Alexander, London, Canada

[73] Assignee: The Serco Corporation, Ontario, Canada

[21] Appl. No.: 466,799

[22] Filed: Jan. 18, 1990

[51] Int. Cl.5 ............................................. B65G 69/00
[52] U.S. Cl. .................................. 414/401; 414/396; 414/584
[58] Field of Search ........................ 414/346, 401, 584

[56] References Cited

U.S. PATENT DOCUMENTS

| | | | |
|---|---|---|---|
| 4,443,150 | 4/1984 | Hahn et al. | 414/401 |
| 4,472,099 | 9/1984 | Hahn et al. | 414/401 |
| 4,674,941 | 6/1987 | Hageman | 414/401 |
| 4,695,216 | 9/1987 | Erlandsson | 414/401 |
| 4,759,678 | 7/1988 | Hageman | 414/396 X |
| 4,938,647 | 7/1990 | Erlandsson | 414/401 |
| 4,946,330 | 8/1990 | Pederson et al. | 414/401 |

Primary Examiner—Frank E. Werner
Assistant Examiner—Craig Slavin
Attorney, Agent, or Firm—Sughrue, Mion, Zinn, Macpeak & Seas

[57] ABSTRACT

A vehicle restraint employs a 4 bar linkage to lift a restraining member to a position that engages a vehicle thus restraining it at a loading dock. The linkage is upwardly based to hold the unit in an engaging position and may be retracted by using any of a number of mechanical techniques such as hydraulic electric or pneumatic power. The 4 bar linkage transfers all loading on the unit from the ICC to the frame thus isolating any driven members from overloads. A secondary hook mounted to the 4 bar linkage is pivotally spring loaded to limit vehicle travel away from the dock and to extend the capture range of the device in the case of ICC's bars that are damaged or mounted at non-standard positions at the rear of the vehicle.

22 Claims, 5 Drawing Sheets

VEHICLE RESTRAINT

BACKGROUND OF THE INVENTION

This invention relates to a vehicle restraint, and in particular to a mechanical device which is used to restrain a vehicle which has been parked at a loading dock.

Vehicle restraints have been used in the material handling industry to prevent a vehicle from moving away from a loading dock as it is being loaded and/or unloaded. In general, these devices act as substitutes for chains and wheel chocks. They share a common trait in that all use the ICC bar of the vehicle as the technique by which the vehicle is engaged and restrained. Such ICC bars are required by law and are placed at the rear end of the vehicle within specified height and distance parameters from the ground and the rear of the vehicle. As the vehicle is loaded and/or unloaded it tends to "float", that is, move vertically thereby varying the vertical position of the ICC bar from the ground. Various devices have been proposed and some placed into practice to restrain vehicles yet take into account vehicle float. Existing vehicle restraints fall into three general categories.

The first category of vehicle restraints are those which employ a carriage having rollers or the like which ride on tracks mounted to the dock wall. The use of a vertically moving carriage provides range to engage ICC bars at different heights. Representative are U.S. Pat. Nos. 4,472,099, 4,443,150, 4,282,621, 4,264,259 and 4,695,216. In these devices the rollers are subjected to restraining loads and repeated motion as the truck moves up and down while it is being loaded or unloaded. Thus, these restraints are generally high maintenance items given the mechanical arrangement. Additionally, some of these vehicle restraints require impact by the truck to position the device so that it can locate the ICC bar. That is, the vehicle backs into position and the ICC bar strikes the restraint which results in movement of the restraint to position a locking hook relative to the bar. This causes additional shock loads on the track and roller mechanism. Moreover, the track itself must be supported by a building wall and, in the case of a loading dock, may interfere with the operation of the leveler itself. In other cases a wall may not be present or the wall material may be a cinder block or other material not strong enough to support the vehicle restraint.

A second class of devices employ a vertical bar which is raised to a position in front of the ICC bar restraining the forward motion of the vehicle. Various techniques have been proposed to raise such a bar. In U.S. Pat. No. 4,634,334 an electric motor is used to reciprocate a bar from an inoperative position to an operative position. A swinging hook mechanism manually operated is disclosed in U.S. Pat. No. 4,605,353. U.S. Pat. No. 4,784,567 employs a device having a cylinder sunk into the ground with the bar being vertically raised as its slides upward on a track. Thus, as noted, some of these devices pivot the bar into the vertical raised position. In those cases because the bar must fully pivot to the vertical position, the raised height of the bar is constant and may interfere with hitches or other equipment mounted on the underside of the vehicle.

Still others, such as U.S. Pat. No. 4 784 567, telescope upward from a fixed housing and therefore can be raised to any required height while staying below the equipment on the truck which might interfere. However, any telescoping device has a limitation that the length of the housing must be greater than the travel of the moving part. For example, to reach a height of 30 inches above the ground, maximum height for an ICC bar, one device has a housing height of 17 inches and a travel of 13 inches providing an overlap of 4 inches at maximum extension. However, a high housing prevents use with low trucks some of which are less than 13 inches above the driveway. Other devices used have a housing which is shorter, 12 inches above the driveway with a travel of 18 inches. These, however, require a hole to be excavated in the driveway to allow the bar to retract into the lower part of the housing.

A third class of devices use one or more hooks which pivot about a fixed hinge mounted on the dock wall. The arc of travel of the hook causes the distance from the wall to the hook to vary as it moves up and down. If the distance decreases as the truck is loaded or unloaded he hook can trap the truck so that it will not release when desired. Typical of such devices are U.S. Pat. Nos. 4,208,161 and 4,605,353.

To overcome some of these deficiencies the art has also suggested a series of complex linkage mechanisms to provide both low profile yet sufficient capture range so that a vehicle will be "captured" and restrained. Typical of those vehicle restraints are U.S. Pat. Nos. 4,674,941 and 4,695,216. In those cases given the complex mechanisms which require roller bearings and the like, the vehicle restraints again are high maintenance items. Also, the restraining member itself may not move vertically but rather, have an arcuate movement as the device is erected thereby raising the question of potential interference and blockage as a result of items which project from the bottom of the truck.

SUMMARY OF THE INVENTION

Given the deficiencies in the prior art, it is an object of this invention to design a vehicle restraint which provides for a simple mechanical device of low maintenance.

A further object of this invention is to provide a vehicle restraint which eliminates the drawbacks of the prior art and provides sufficient capture range for trucks having ICC bars at various locations.

Yet another object of this invention is to provide for vehicle restraint which can be mounted to either a dock wall or to a horizontal surface, such as a dock approach, yet requires no excavation or installation.

These and other objects of this invention are accomplished by means of vehicle restraint which provides a positive lock onto a vehicle ICC bar by employing a 4 bar linkage type mechanism which retracts into a low profile housing. The mechanism provides for vertical movement of the restraining member without sliding or rolling movement and can be actuated by a variety of power sources. That is, the device is not limited to either manual, pneumatic, hydraulic or electrical actuation. Any of those techniques may be employed. Additionally, since the linkage mechanism is positively biased upward by means of a spring device the device will always follow a vehicle of varying height as the truck floats during the loading and/or unloading process. These and other facets of this invention will be described in greater detail by referring to the attached drawing and the description of the preferred embodiment which follows.

DESCRIPTION OF THE PREFERRED EMBODIMENT

Figure 1:
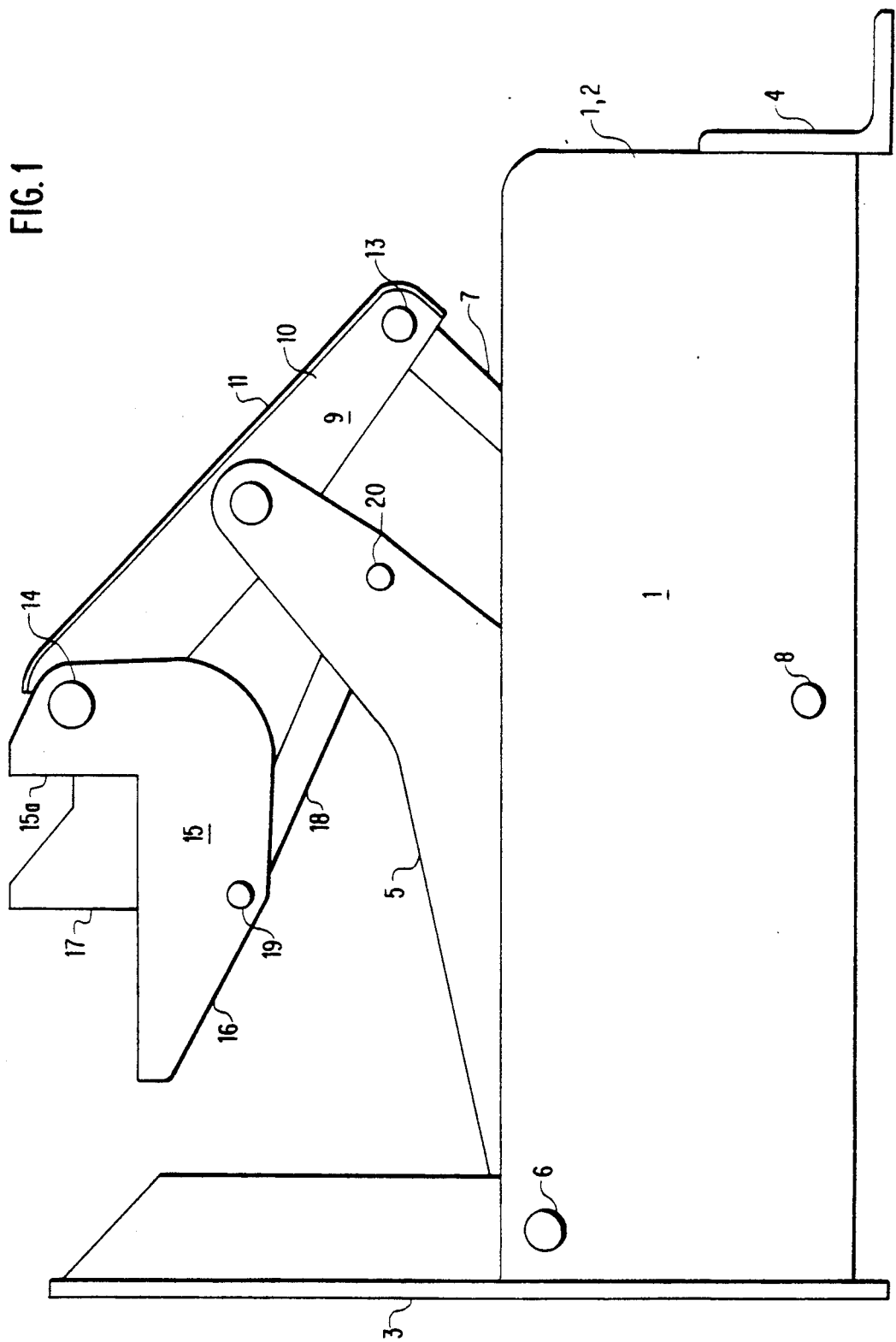
FIG. 1 is a side view illustrating the vehicle restraint of this invention in a partially raised position.
Figure 2:
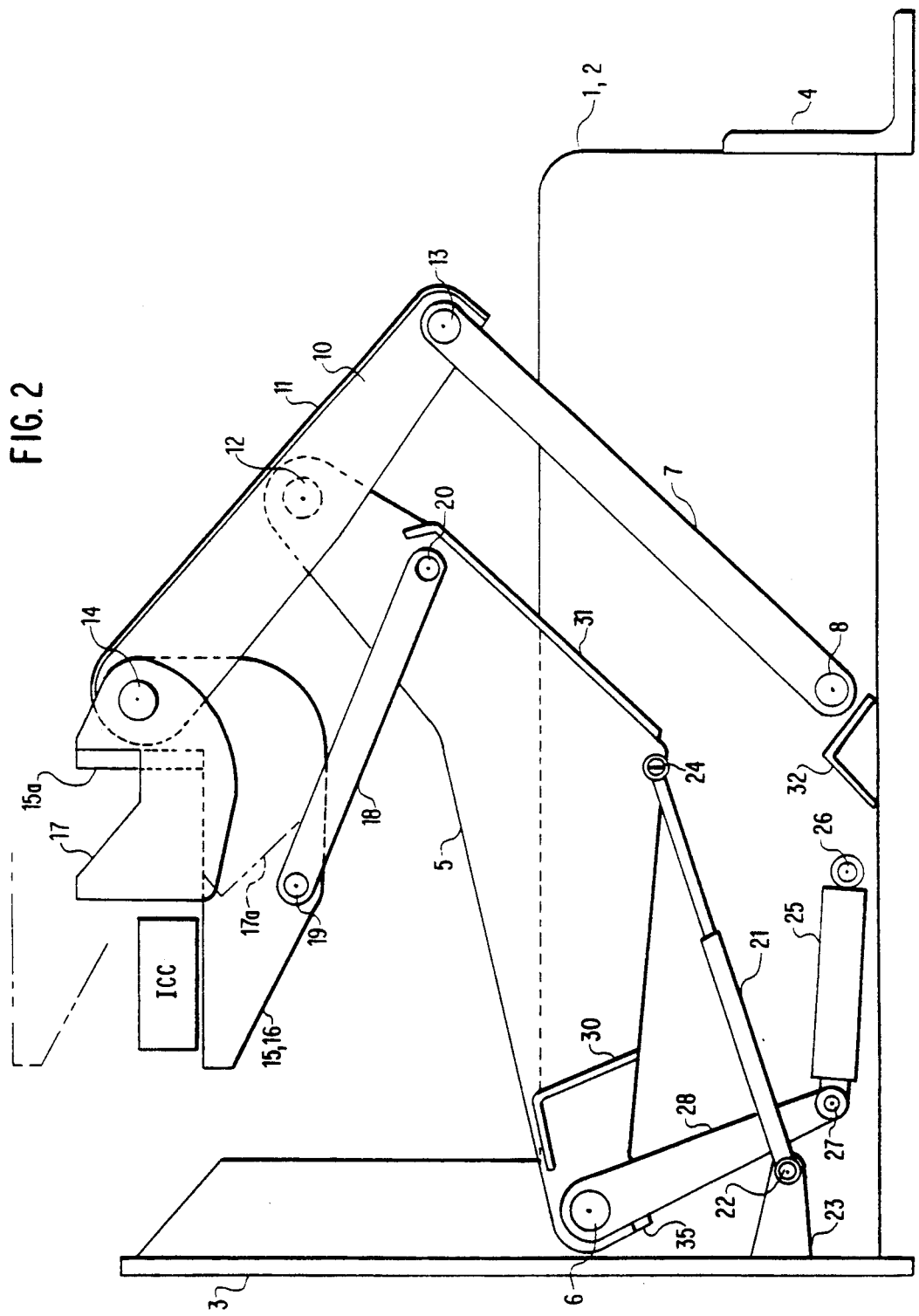
FIG. 2 is a sectional side view taken through the center of the mechanism.

Referring now to FIG. 1, the basic linkage elements of this invention are illustrated in a partially raised position. The frame assembly 1 comprises a pair of side plates 2 and a back plate 3. Channel member 32, see FIG. 2 is coupled to both side plates to provide lateral strength to the frame assembly. The back plate 3 may be fastened to the wall of the loading dock by means of mounting screws or bolts, not illustrated. If the device is to be mounted on the surface of an approach such as a driveway then an angle beam 4 may be added to the front of the frame. The angle beam would then be bolted into the driveway. The side plates may be slightly elevated off the surface so that water, and debris would be swept underneath the device.

As illustrated in FIGS. 1 and 2 a pair of arms 5 pivot about a pin 6, which passes through each of the side plates 2. Plates 30 and 31 join the arms 5 together and provide lateral strength to the restraint unit. A strut member 7 pivots about a pin 8, which also passes through the side plates 2. A lever assembly 9 is attached to the arms 5 and the strut 7 by means of pins 12 and 13.

The lever assembly 9 comprises a pair of bars 10 covered by a top plate 11. The upper end of each of the bars 10 fits between two side plates 16 of the hook assembly 15. The bars 10 are connected to the hook assembly 15 by means of pin 14.

Figure 5:
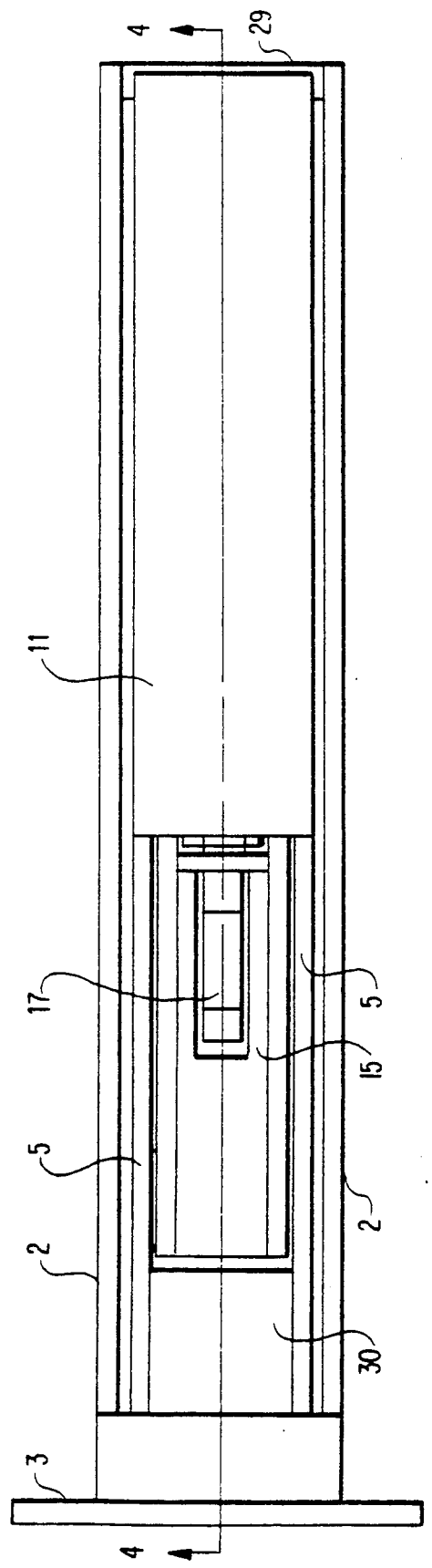
FIG. 5 is a top view of the device in the stored position illustrating the section through which FIG. 4 has been taken.

A secondary hook 17 pivots on pin 14 between the bars 10 and inside the hook 15, as shown in FIG. 5. FIG. 1 illustrates the secondary hook 17 in an upward position and FIG. 2 in the dotted line 17a, illustrates the hook 17 pivoted in a downward position. The hook is held up by means of a spring, not shown.

The hook assembly 15 is maintained in a horizontal position by a pair of struts 18. The struts 18 are attached to the hook assembly 15 by means of a pin 19. The struts 18 are coupled to the arms 5 by means of pin 20.

Figure 3:
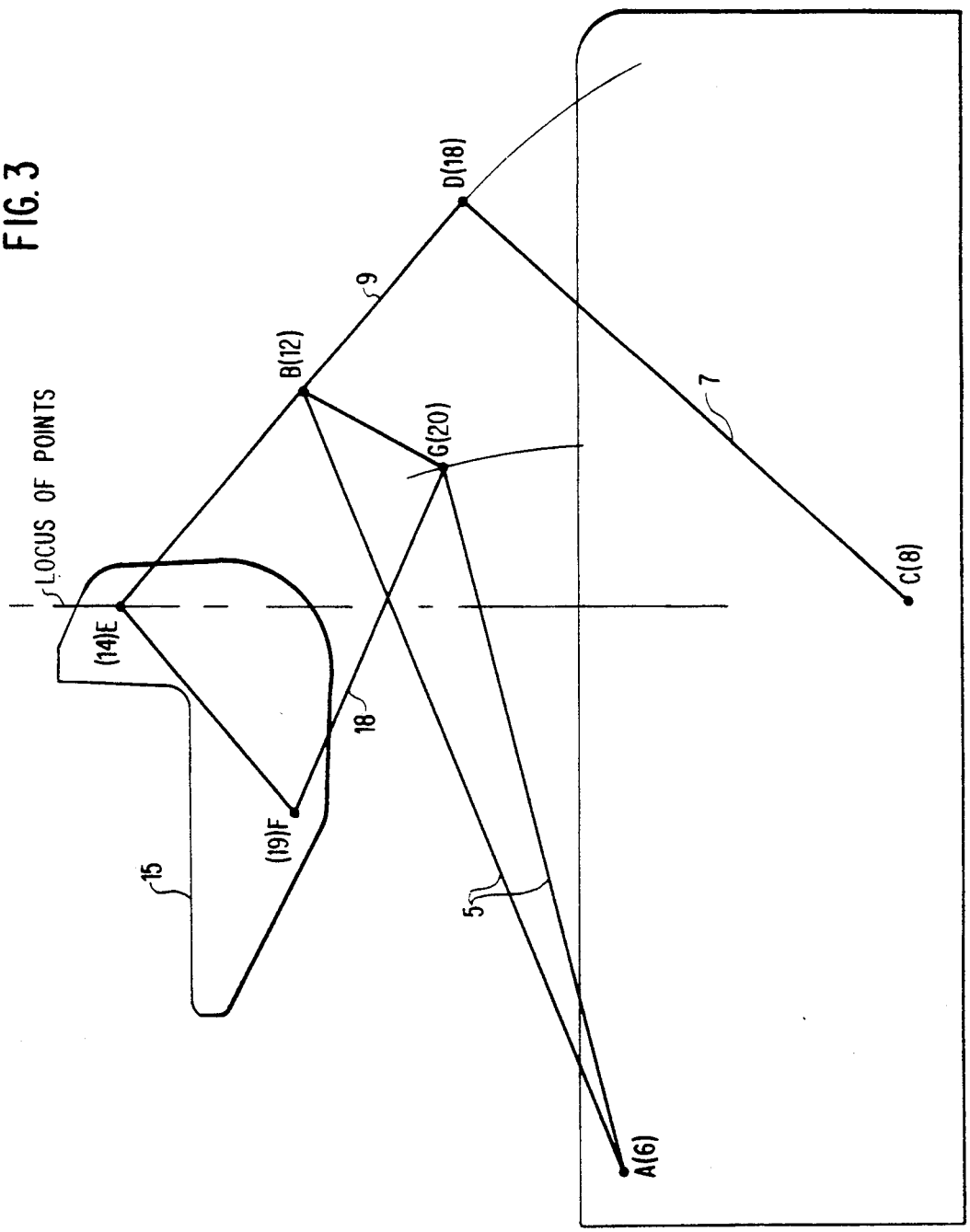
FIG. 3 is a schematic view which illustrates the functioning of the mechanism.

Referring now to FIG. 3, the basic operation of this mechanism is illustrated. FIG. 3 portrays, in line form, the salient elements of FIGS. 1 and 2 to demonstrate how the device is raised and lowered. The linkage is a so called 4-bar type used to translate reciprocating motion into linear movement and the converse thereof. Those of working skill will recognize that the geometry is not regular but chosen by member length and pin position to give the necessary movement without any substantial rotational component to the restraining member. From the description so far the motive force to achieve this raising and lowering has not yet been described, and will be set forth herein.

In FIG. 3 the arm 5 pivots about a point A. Point A corresponds to the pin 6. The length of the strut 7, the lever assembly 9 and the position of point C, the pin 8, is selected so that the path of point E, pin 14, is very close to a straight vertical line. That point of travel is illustrated by the chain vertical line in FIG. 3 labelled "locus of point E".

The position of points F and G, which correspond to pins 19 and 20 respectively, are selected so that the hook assembly 15 remains horizontal as the other members rotate. Thus, as the device is raised from an inoperative position, shown in FIG. 4, to an operative position, illustrated in FIG. 2, point E moves vertically and the hook assembly 15 remains in a horizontal position.

Referring now to FIG. 2, the technique for raising the mechanism is illustrated so that the hook assembly 15 engages the ICC bar labelled in that figure "ICC". In the embodiment of FIG. 2 a spring 21 is employed. This is preferably a gas spring having a low spring rate. It is mounted to the frame by means of a pin 22, which in turn is coupled to a bracket 23 attached to the back plate 3. The piston end of the spring 21 is attached to one of the arms 5 by means of pin 24. If needed a second parallel spring may be used attached to the other arm.

As illustrated in FIG. 2, the ICC bar is attached to the rear of a truck. The restraint of this invention is raised by spring 21 until the hook assembly 15 contacts the ICC bar. The bar and, thus, the truck are thus restrained from moving forward, to the right in FIG. 2, by means of the secondary hook 17. With the hook in the position illustrated in FIG. 2, the load caused on the device should the truck tend to move forward would be borne exclusively by the linkage mechanism and not by the spring assembly 21. Thus, the mechanism isolates the spring and any powered elements from shock loading caused by truck movement.

If the ICC bar is deformed or otherwise caused to be mounted further forward on the truck, the secondary hook 17 will be forced down to a position 17a. The ICC bar will then be restrained by the vertical part of the hook assembly 15, flat vertical face 15a. FIG. 2 also illustrates the technique by which the ICC bar is released from the device. A hydraulic cylinder 25 is employed. The cylinder 25 is attached to one end of the frame by means of pin 26. The pin 26 passes through side plates 2. The other end of the hydraulic cylinder is fastened by pin 27 to a pair of arms 28, which are in turn pivoted on the pin 6. A stop bar 35 on arm 5 constrains clockwise movement of arm 28. That is, arms 5 are considered integral to arms 28 when arm 28 abuts bar 35.

As the arms 5 raise as illustrated in FIG. 2 the hydraulic cylinder 25 retracts. However, as the restrained vehicle floats up and down relative movement between arms 5 and 28 takes place. The cylinder is unloaded and does not follow this motion. This reduces friction and wear. To retract the device the cylinder is actuated.

Figure 4:
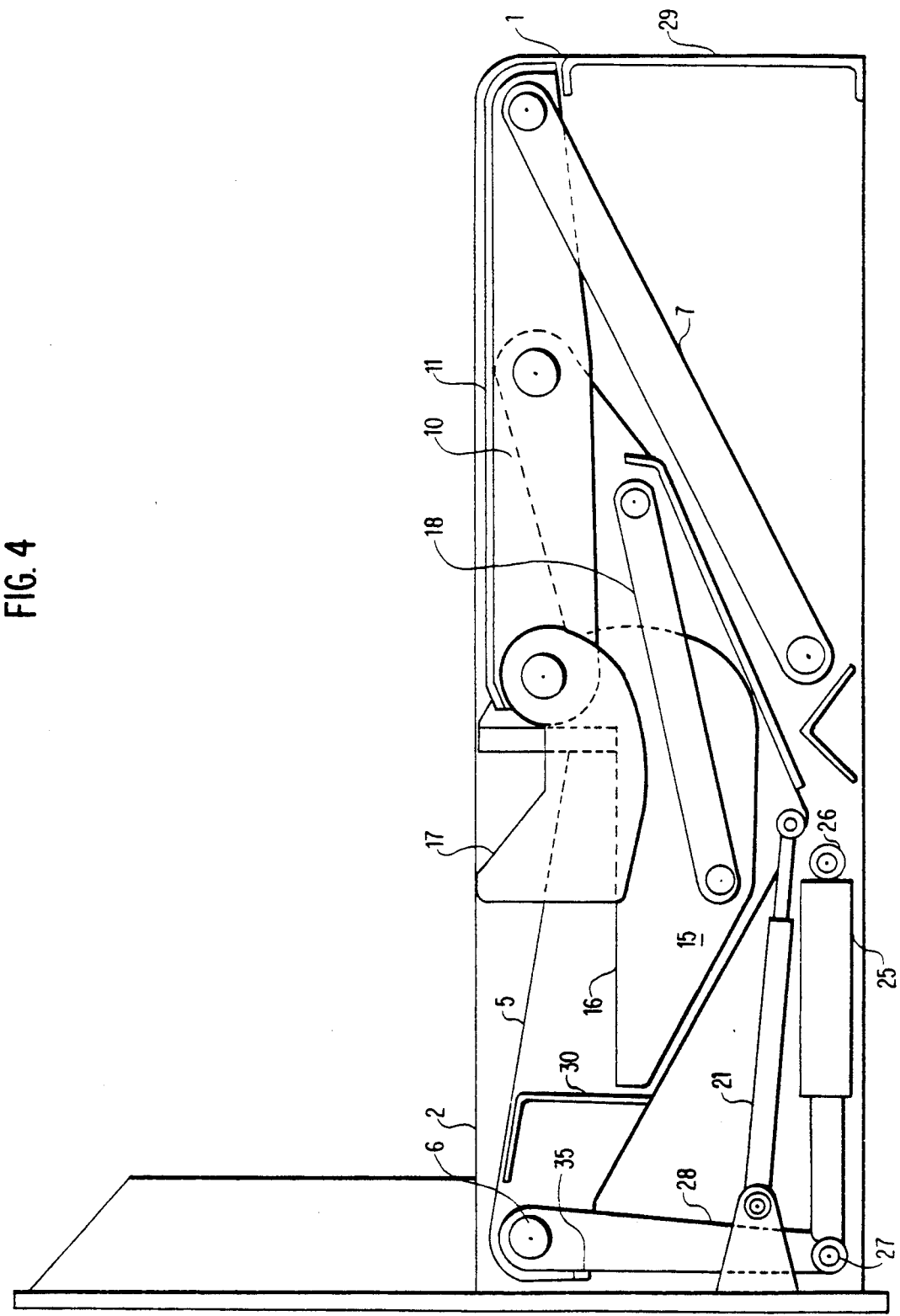
FIG. 4 is a sectional view of the device through the center thereof with the device in a fully retracted position.

As illustrated in FIG. 4 by extending the piston from cylinder 25, the piston extension causes pin 27 to move to the left thereby causing arm 28 to abut bar 35 and to move arm 5 for clockwise pivotal movement about pin 6 and cause downward rotation of the hook. At the same time the spring 21 is compressed.

While a hydraulic device is illustrated as the technique for causing the device to retract to its inoperative position, one of working skill would recognize that an electric actuator, pneumatic cylinder or other technique of manually lowering the device, held by a latch could also be alternatively employed.

Additionally, the position of the mechanism and contact of the hook with the ICC bar could be sensed by limit switches, not shown, and used to control the actuator and signal lights which are customary in such dock installations.

FIG. 4 illustrates a section of the device in its retracted, or inoperative position. The linkage mechanism has been fully retracted and is housed entirely within plates 2. The front portion of the lever assembly 9 rests on the front plate 29 of the frame assembly 1. The top plate 11 forms a flat cover which conceals and protects the overall mechanism. Plate 30 has a generally horizontal portion to protect that portion of the mechanism between the retracted hook assembly and the end plate. This is illustrated in FIG. 5.

The stored position of the device is illustrated in FIG. 5, a top view of the device. As illustrated, the top plate 11 of the assembly 9 covers the front portion of the mechanism. The hooks 15 and 17 are lowered below the top of the frame assembly 1. This compact design is thus achieved by nesting the components. As illustrated, all components fit between the side plates 2 of the frame assembly 1 to form a unitary device which may be mounted either on the dock approach or bolted to the dock face. This nesting occurs because the secondary hook 17 fits between the bars 10 of the lever assembly 9. In turn, the bars 10 fit between the side plates 16 of hook assembly 15 which rests between the arms 5.

Thus, as can be appreciated, by this invention a vehicle restraint extends from a low housing, approximately 12 inches high to a height exceeding 30 inches. Because the purpose of any vehicle restraint is to prevent a truck from moving away from the loading dock this vertical range represents an important improvement. Additionally, by the use of a secondary hook the device can capture an ICC bar in a range of locations yet at the same time limit the horizontal travel or running room to half the length of the hook assembly.

An additional advantage of this invention is that the assembly itself is not dependent on a particular technique or mode of power. Depending on condition and preference manual, pneumatic, hydraulic or electrical actuation may be used as desired.

Additionally, since the device is always biased upward by means of the spring the device will follow a vehicle of varying height as it is loaded or unloaded. Moreover, the device will be in the elevated or operative position and thus act in a fail-safe mode maintaining the locked position of the vehicle in the event of loss of power.

It will be appreciated by one of working skill that modifications of this invention may be practiced without departing from the essential scope thereof. For example the arms 5 and 28 can be formed of a rigid member to simplify the construction.

Having defined my invention, I claim:

1. A device for restraining a vehicle to prevent movement away from a loading dock comprising:
   a housing adapted to be secured in a stationary manner relative to said loading dock;
   a lever assembly mounted to said housing for pivoting motion relative to said housing;
   a restraining member movable between an inoperative position where said lever assembly and said restraining member are substantially contained in said housing and an operative position;
   means for attaching said restraining member to said lever assembly for moving said restraining member in essentially a vertical direction between said inoperative and operative positions without any horizontal component to such movement and wherein said lever assembly comprises first and second arms each respectively pivoted to said housing, said means for attaching comprising a third arm coupling said restraining member to said first arm and a fourth arm coupled to both said first and second arms and to said restraining member.

2. The device of claim 1 further comprising spring means to bias said lever assembly in said operative position of said restraining member.

3. The device of claim 1 further comprising means to move said restraining member from said operative position to said inoperative position.

4. The device of claim 3 wherein said means to move said restraining member from an operative position to an inoperative position comprises a powered piston cylinder coupled to said lever assembly.

5. The device of claim 1 further comprising a secondary restraining member pivotally mounted to said restraining member, said secondary restraining member limiting movement of said vehicle once said restraining member has been placed in said operative position.

6. The device of claim 1 wherein said means for attaching further comprises a top plate covering said housing when said restraining member is in said inoperative position.

7. A device for restraining a vehicle to prevent movement away from a loading dock comprising:
   a housing adapted to be secured in a stationary manner relative to said loading dock;
   a lever assembly mounted to said housing for pivoting motion relative to said housing;
   a restraining member movable between an inoperative position where said lever assembly and said restraining member are substantially contained in said housing and an operative position;
   means for attaching said restraining member to said lever assembly for moving said restraining member in essentially a vertical direction between said inoperative and operative positions without any horizontal component to such movement, and a secondary restraining member pivotally mounted to said restraining member, said secondary restraining member limiting movement of said vehicle once said restraining member has been placed in said operative position.

8. The device of claim 7 wherein said lever assembly comprises first and second arms each respectively pivoted to said housing, said means for attaching comprising a third arm coupling said restraining member to said first arm and a fourth arm coupled to both said first and second arms and to said restraining member.

9. The device of claim 8 further comprising means to couple said first and second arms together.

10. The device of claim 7 wherein said level assembly further comprises a pair of first arms pivoted to said housing, said pair of first arms each having a first section pinned to said housing and a second section pinned to said means to attach, and a plate member joining said pair of first arms together.

11. The device of claim 10 wherein said restraining member is mounted to move vertically between said pair of first arms and to store therebetween when it is in said inoperative position.

12. A vehicle restraint comprising:

a housing rigidly mounted to a stationary surface, said housing having a pair of sidewalls and a plate joining said side walls together;

lever means mounted to said housing for rotational movement relative to said housing;

a vehicle restraining member movable from an inoperative position where said lever assembly and said restraining member are contained within said housing to an extended operative position;

means coupled to said sidewalls attaching said vehicle restraining member to said lever assembly for moving said vehicle restraining member to said operative position by essentially vertical motion without any horizontal movement of said restraining member, and wherein said lever means comprises first and second arms each respectively pivoted to said housing, said means for attaching comprising a third arm coupling said restraining member to said first arm and a fourth arm coupled to both said first and second arms and to said restraining member.

13. The device of claim 12 further comprising spring means to bias said lever assembly in said operative position of said restraining member.

14. The device of claim 12 further comprising means to move said restraining member from said operative position to said inoperative position.

15. The device of claim 14 wherein said means to move said restraining member from an operative position to an inoperative position comprises a powered piston cylinder coupled to said lever assembly.

16. The device of claim 12 further comprising a secondary restraining member pivotally mounted to said restraining member, said secondary restraining member limiting movement of said vehicle once said restraining member has been placed in said operative position.

17. The device of claim 12 wherein said means for attaching further comprises a top plate covering said housing when said restraining member is in said inoperative position.

18. The device of claim 12 wherein said lever means further comprises a pair of first arms pivoted to said housing, said pair of first arms each having a first section pinned to said housing, and a second section pinned to said means to attach, and a plate member joining said pair of first arms together.

19. The device of claim 18 wherein said restraining member is mounted to move vertically between said pair of first arms and to store therebetween when it is in said inoperative position.

20. A vehicle restraint comprising:

a housing rigidly mounted to a stationary surface, said housing having a pair of sidewalls and a plate joining said side walls together;

lever means mounted to said housing for rotational movement relative to said housing;

a vehicle restraining member movable from an inoperative position where said lever assembly and said restraining member are contained within said housing to an extended operative position;

means coupled to said sidewalls attaching said vehicle restraining member to said lever assembly for moving said vehicle restraining member to said operative position by essentially vertical motion without any horizontal movement of said restraining member; and a secondary restraining member pivotally mounted to said restraining member, said secondary restraining member limiting movement of said vehicle once said restraining member has been placed in said operative position.

21. The device of claim 20 wherein said lever means comprises first and second arms each respectively pivoted to said housing, said means for attaching comprising a third arm to said first arm coupling said restraining member and a fourth arm coupled to both said first and second arms and to said restraining member.

22. The device of claim 21 further comprising means to couple said first and second arms together.

* * * * *